United States Patent [19]

Sytsma

[11] Patent Number: 5,238,255
[45] Date of Patent: Aug. 24, 1993

[54] OIL RING ASSEMBLY

[75] Inventor: Steven J. Sytsma, Muskegon, Mich.

[73] Assignee: Sealed Power Technologies, Muskegon, Mich.

[21] Appl. No.: 833,771

[22] Filed: Feb. 11, 1992

[51] Int. Cl.[5] ................................................ F16J 9/06
[52] U.S. Cl. ..................................... 277/136; 277/139
[58] Field of Search ............... 277/136, 137, 139–142, 277/150, 197

[56] References Cited

U.S. PATENT DOCUMENTS

| 1,204,024 | 11/1916 | Johnson | 277/141 X |
|-----------|---------|---------|-----------|
| 1,424,377 | 8/1922 | Ray | 277/197 |
| 1,861,716 | 6/1932 | Petre | 277/197 |
| 2,789,872 | 4/1957 | Olson . | |
| 3,055,669 | 9/1962 | Knoebel | 277/139 |
| 3,105,695 | 10/1963 | Burns et al. . | |
| 3,184,245 | 5/1965 | Woolcott . | |
| 3,189,986 | 6/1965 | Mayfield | 277/139 X |
| 3,346,252 | 10/1967 | Saylor . | |
| 3,391,943 | 7/1968 | Riley | 277/137 |
| 3,814,444 | 6/1974 | Johnson et al. . | |
| 4,572,520 | 2/1986 | Shinada . | |
| 4,579,351 | 4/1986 | Daffron . | |
| 4,585,237 | 4/1986 | Koop . | |

FOREIGN PATENT DOCUMENTS

| 917939 | 9/1954 | Fed. Rep. of Germany | 277/139 |
|--------|--------|----------------------|---------|
| 877101 | 10/1981 | U.S.S.R. | 277/139 |
| 551855 | 3/1943 | United Kingdom | 277/137 |
| 555348 | 8/1943 | United Kingdom | 277/140 |

Primary Examiner—William A. Cuchlinski, Jr.
Assistant Examiner—Scott W. Cummings
Attorney, Agent, or Firm—Barnes, Kisselle, Raisch, Choate, Whittemore & Hulbert

[57] ABSTRACT

An oil ring assembly comprising a pair of split rails and a piston ring spacer/expander on which said rails are mounted. Each rail is provided with a radially inwardly extending protrusion that lies substantially entirely within the thickness of the rail. The protrusion extends into and engages the spacer expander to limit the circumferential movement of the rail relative to the spacer/expander.

4 Claims, 3 Drawing Sheets

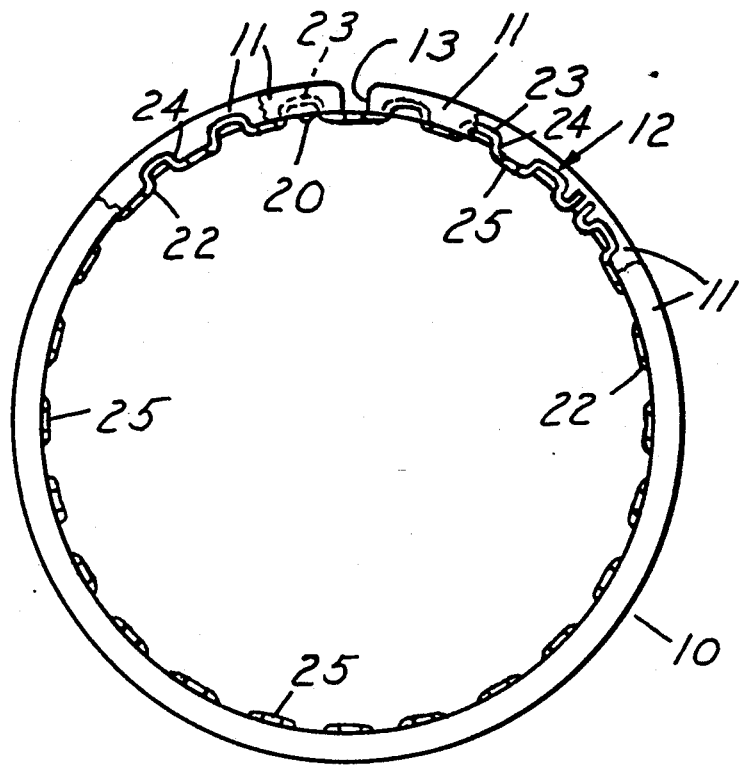
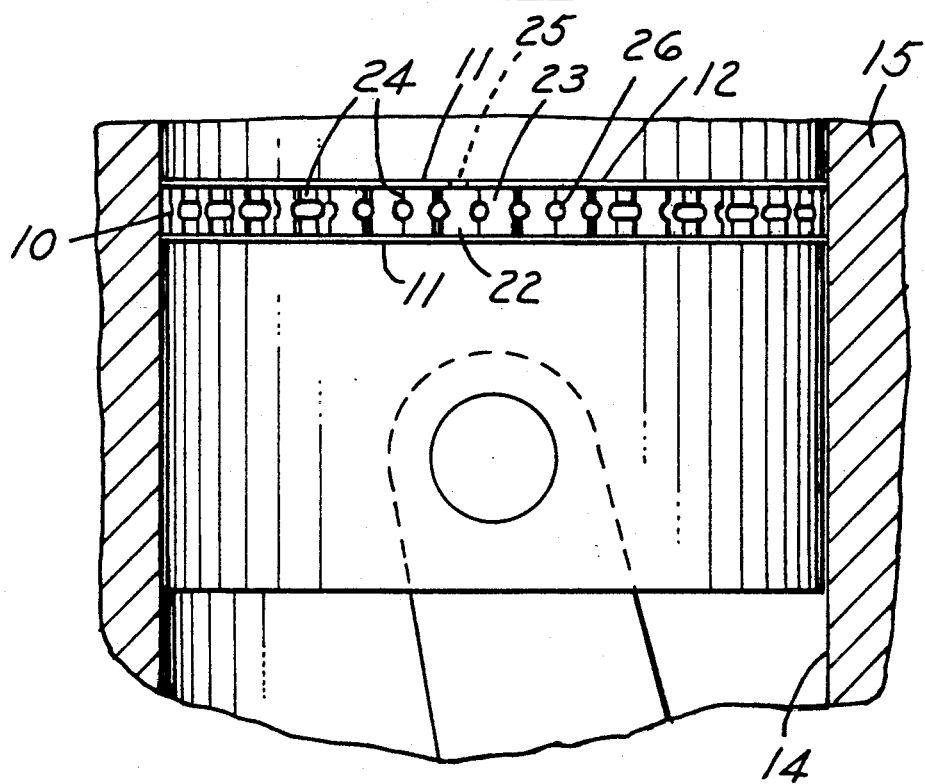

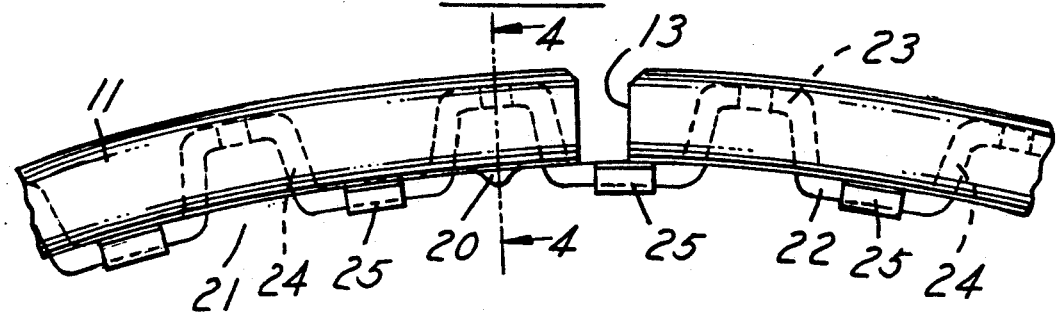
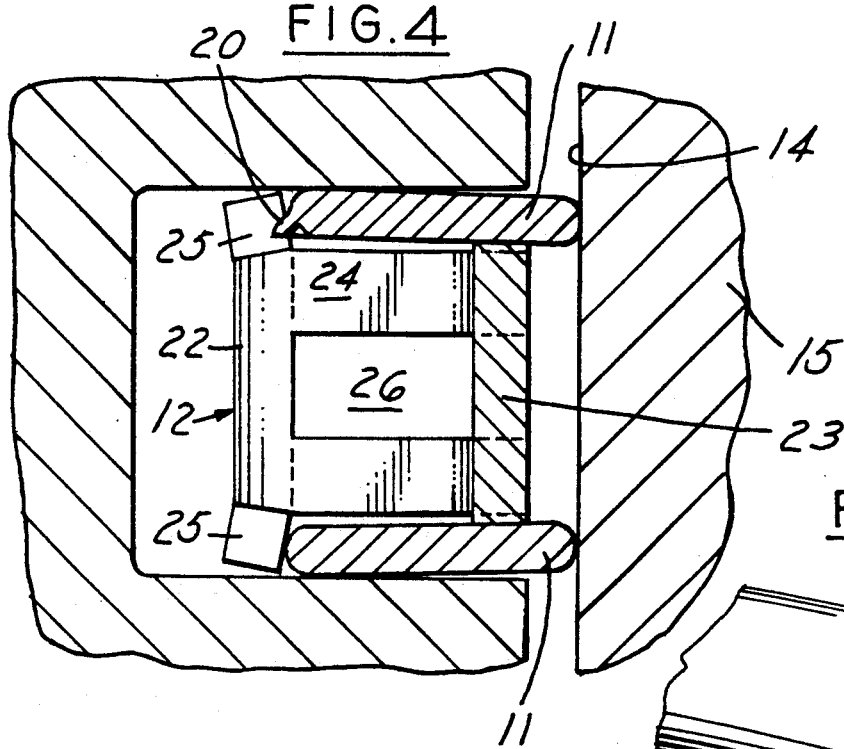
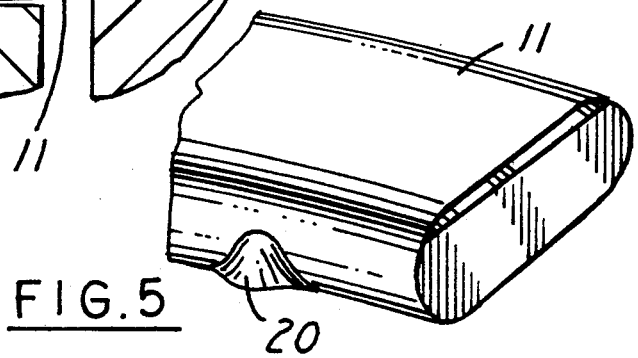
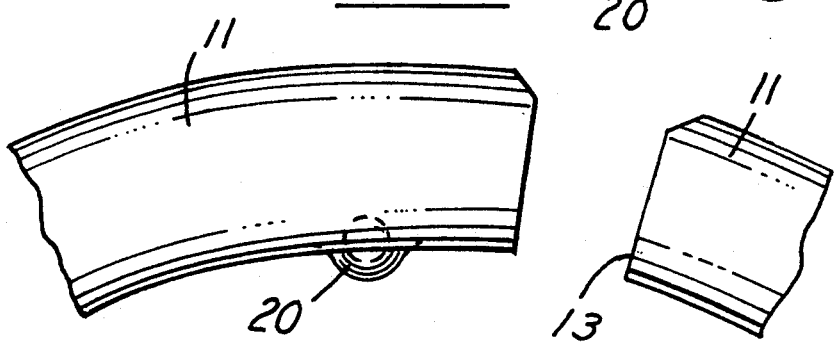

OIL RING ASSEMBLY

BACKGROUND AND SUMMARY OF THE INVENTION

It is conventional to provide oil ring assemblies for internal combustion engines with two oil rails that are yieldingly urged radially outwardly into contact with the cylinder wall of an engine by a piston ring spacer-/expander. It has been found by extensive testing that there is a tendency for the oil rings to move circumferentially so that the oil ring gaps align with each other and frequently with the gap of the spacer/expander. In such an occurrence, oil consumption of the engine is substantially increased.

Past history has proven that there is a detriment to oil economy when the gaps of the two rails align circumferentially. The magnitude of this detriment has been measured in the range of 40% reduction in oil economy.

There is, therefore, a need to lock the rotation of each rail relative to the expander in an installed staggered circumferential orientation. Prior art to accomplish this desired goal is represented in U.S. Pat. No. 4,572,520. In this patent, two potential locking methodologies are presented. One presents an axial displacement of rail material to engage with the expander. This methodology, although effective, results in "directional" rails which must be oriented, whereby, the axial displacement of the top rail must be installed downward to engage the expander and the axial displacement of the bottom rail must be installed upward to also engage the expander. The second methodology presented in U.S. Pat. No. 4,572,520 presents a rivet feature which protrudes axially from the rail in both directions. This feature is "nondirectional"; however, the presence of the axial displacement on the rail towards the groove side requires the presence of a relief into the groove to accept the rivet head, as well as the need to orient the rail upon assembly, whereby the rivet head is circumferentially aligned with the groove relief. Additionally, this method results in the locking of rail rotation relative to the piston. Both methods require the proper orientation of the rail relative to the expander prior to the installation of the rail with the expander. These directional and/or circumferential orientation features present major inconvenience to the automated loading and circumferential staggering of the oil ring components.

Prior art to accomplish component circumferential staggering of gaps for multiple piece compression ring assemblies exists as demonstrated in U.S. Pat. No. 3,391,942. In this patent, an expander ring is bent to form ribs that engage recesses on compression rings. Due to the multitude of components, with dimension stackups and the associated degree of difficulty in loading said components into compression groove, the assembly is economically prohibitive.

Other oil ring patents exist (U.S. Pat. Nos. 3,184,245 3,346,252 and 3,105,695) which exhibit locking mechanisms to lock the rotation of the expander relative to the piston but do not restrict the rotation of the rails relative to the expander.

Among the objectives of the present invention are to provide an oil ring assembly which obviates the aforementioned problems; which can be achieved at relatively low cost; which can be assembled readily without any possibility of misassembly; and which would be effective to eliminate any possibility of alignment of the gaps of the oil ring rails and the spacer/expander.

An oil ring assembly embodying the invention comprises a pair of split rails and a piston ring spacer and expander on which said rails are mounted. Each rail is provided with a radially inwardly extending protrusion that lies substantially entirely within the thickness of the rail. The protrusion extends into and engages the spacer expander to limit the circumferential movement of the rail relative to the spacer/expander.

A feature of the present invention is the fact that the locking force (to prohibit rotation of the rails independently relative to the expander) is energized by the tension generated by the expander upon compression of the assembly to bore diameter. This feature permits the ability to stagger the relative orientation of the expander and the rails after installation of the components into the oil ring groove but prior to compression of the assembly to bore diameter. This feature is important since some automated ring installation equipment installs the rails onto the piston groove aligned with each other and subsequent circumferential staggering is required and not possible with oil ring prior art U.S. Pat. No. 4,572,520.

Another feature of the radial protrusion on the invention is that the rail is functionally axially nondirectional and no efforts must be expended to orient the rail's bump side up or bump side down as contrasted with the axial locking feature in the prior art U.S. Pat. No. 4,572,520.

Another feature of the radial protrusion in this invention is that the rail incorporating this invention is compatible with any spacer/expander in which the circumferential gap between expander rail support contact pads is greater than or equal to the circumferential length of the radial protrusion on the rail. For example purposes only, the described expander per FIG. 1 shall be utilized in describing the invention.

DESCRIPTION OF THE DRAWINGS

FIG. 1 is a part sectional plan view of an oil ring assembly embodying the invention.

FIG. 2 is a sectional view of an internal combustion engine embodying the invention.

FIG. 3 is a fragmentary view on an enlarged scale of a portion of an oil ring assembly.

FIG. 4 is a sectional view on an enlarged scale of a portion of the engine shown in FIG. 2.

FIG. 5 is a fragmentary top plan view of a rail.

FIG. 5A is a fragmentary perspective view of a rail.

DESCRIPTION

Figure 6:
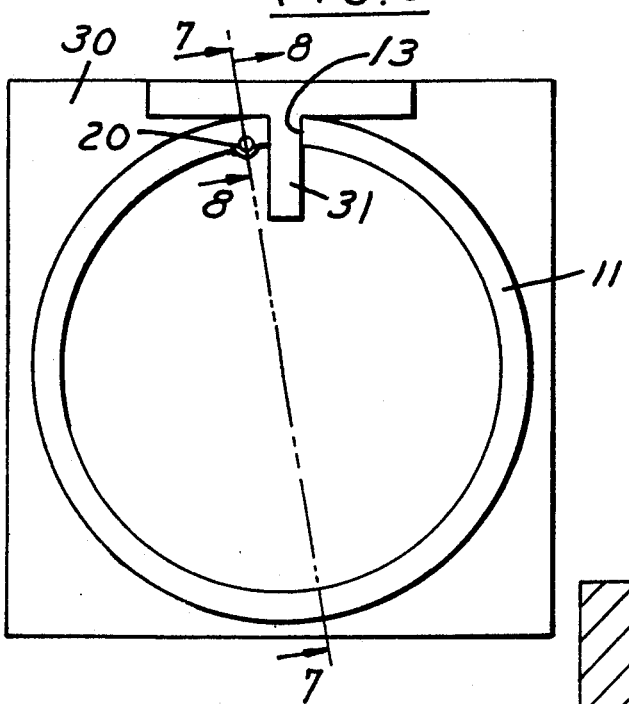
FIG. 6 is a top view of an apparatus for forming a protrusion on a rail.

Referring to FIGS. 1–5A, an oil ring assembly 10 embodying the invention comprises a pair of split rails 11 and a piston ring spacer/expander 12 on which said rails 11 are mounted. Each rail 11 is of generally circular construction with a gap 13 between the ends. The spacer/expander 12 yieldingly urges the rails 11 outwardly into contact with the cylindrical wall 14 of a cylinder 15 of the internal combustion engine. Each rail 11 is generally rectangular in cross-section and has a greater radial thickness than the axial thickness.

In accordance with the invention, each rail 11 is provided with a radially inwardly extending protrusion 20 that lies substantially entirely within the thickness of the rail 11. The protrusion 20 extends into and engages one of the gaps 21 of the spacer expander 12 to limit the circumferential movement of the rail 11.

The spacer/expander 12 is preferably of the type shown in U.S. Pat. No. 2,789,872, incorporated herein by reference. The construction utilizing the protrusion 20 on rail 11 is also applicable to other spacer/expanders which have a radial recess into which the protrusion 20 can extend, for example, spacer/expanders such as shown in U.S. Pat. Nos. 3,814,444, 4,579,351 and 4,585,237, incorporated herein by reference.

The spacer/expander 12 preferably comprises a consecutive series of alternative inward and outward corrugations. The inner corrugations have inner crowns 22 and the outer crowns 23 which are connected by upper and lower connecting legs 24 separated by slots 26. Such slots paralleling the upper and lower edges of the spacer expander extend from the edges of the crowns 22 to and partly into the crowns 23. From each of the inner crowns 22, a short pad 25 extends at both upper and lower edges. Such pads 25 extend upwardly above and downwardly below the edges of the spacer expander respectively and are of narrow width. It is apparent that each connecting leg 24 and each part thereof above and below the slot 25 therein has reversely curved and portions extending from a middle portion and that slots 26 reach from one curved end portion to the other, providing a readily controlled, uniform flexibility in the several connecting legs in circumferentially contracting the spacer/expander.

Such structure is made from a single length of flat metal material. The connecting portions between the inner and outer crowns, because of their location and because of the removal of the metal when the slots are made, have flexibility so that they yield when the spacer expander member is contracted circumferentially. It is evident that such spacer expander member is readily made from flat ribbon stock of a desired thickness, the openings provided by the slots being easily made by punching metal from the strip stock, the pads being left upon cutting metal between successive pads at the side edges of the stock.

With such spacer/expander 12, thin parted metal rails 11 are used, one at the upper and one at the lower side, the inner edges of which come against the outer sides of the pads 25. The corrugations extending outwardly from the crowns 22 lie between the upper and lower sides of the lower and upper rails 11 respectively, providing support therefor and holding them spaced. The rails at their outer edges extend beyond the spacer expander a short distance but such outwardly extending corrugations provide ample and stable support for the rails. In practice, it may be desirable to incline the pads 25 at an angle, which may be between 5° and 25°, to the planes of the inner crowns 22 so that the inner edges of the rails 11 pressing thereagainst will cause the inner portions of said rails to tend to move into a sealing engagement against the opposite sides of a ring groove in a piston in which the piston ring, consisting of the rails and the spacer/expander of my invention, is installed. The width of the pads 25, that is, the distance they extend above and below the upper edges of the spacer/expander is such that the pads are readily received in the ring groove but do not reach to the opposite sides thereof. U.S. Pat. No. 2,789,872 is incorporated herein by reference.

Figure 7:
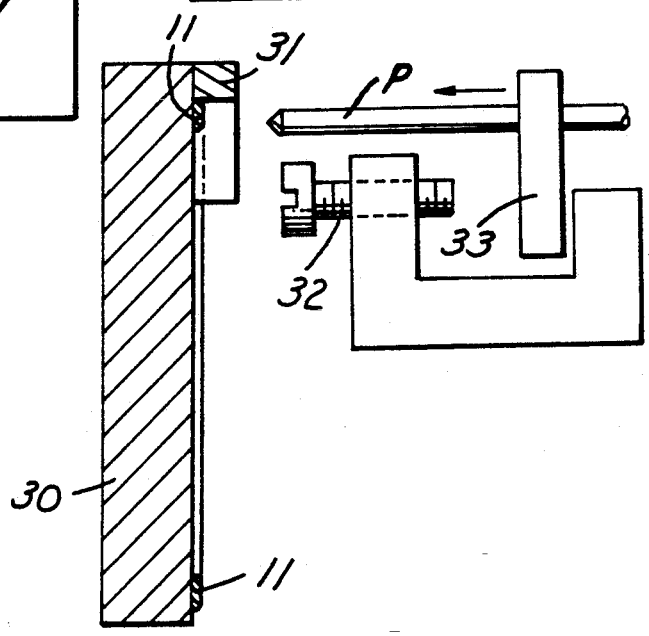
FIG. 7 is a sectional view taken along the line 7—7 in FIG. 6.
Figure 8:
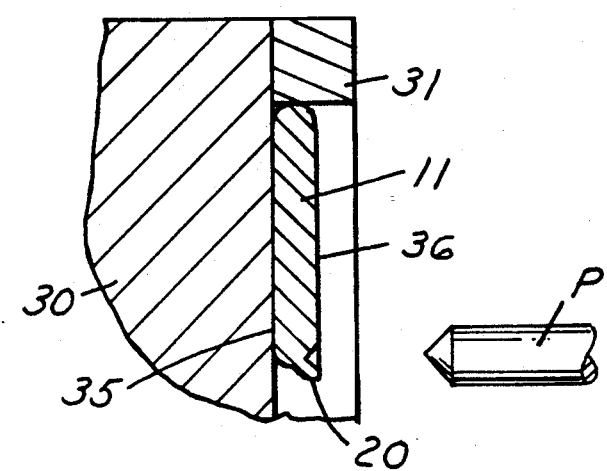
FIG. 8 is a sectional view on an enlarged scale taken along the line 8—8 in FIG. 6.

The protrusion 20 is preferably made by a type of punching operation which is shown schematically in FIGS. 6–8. The rail 11 is positioned on a flat plate 30 which has a radial projection 31 that locates the rail by engaging the gap 13. A punch P is moved axially to form the protrusion 20 by a punching operation. The axial extent of movement of the punch is controlled by a stop 32 in the form of a threaded screw that engages a member 33 that moves with the punch.

As shown in FIGS. 5, 5A and 8, the protrusion 20 extends radially inwardly but lies entirely within the planes of the side surfaces 35, 36 of the rail 11.

The position of the protrusion 20 is spaced radially from the outer diameter of the rail.

When the rails are assembled on the expander 12, the protrusion 20 extends into one of the gap between adjacent pads of the spacer/expander and circumferentially locates the rail. Because the protrusion 20 lies entirely between the opposed surfaces of the rail, the rail 11 need not be positioned with the protrusion toward any particular surface, that is, the rail 11 can be positioned with a protrusion axially outwardly or axially inwardly with respect to the spacer/expander.

The radial magnitude and circumferential location of the radial protrusion 20 are constrained within limits to achieve successful results. The dimensional constraints are limited on the lower limit to that of obtaining sufficient magnitude to effectively stop rotation. A lower limit of approximately 0.001" has been verified. The upper limit is determined based on acceptable limits of distortion to the rail which may be tolerated. The punching of the rail to form the protrusion locally increases the radius of curvature at the location of the punching which could potentially negatively impact the sealing capability of the rail O.D. to the bore. Testing has shown that locating the feature near the rail gap (13) minimizes the impact of the distortion; and when combined with a maximum radial protrusion of 0.009", results in negligible distortion of the rail.

Once the rails are assembled uncompressed to the spacer/expander, the protrusions lightly restrict the rotation. Due to the rounded shape of the protrusions, the rails can be readily rotated relative to the expander for final circumferential positioning (staggering). When the assembly is subsequently compressed to cylinder bore diameter, the tension induced contact forces between the expander contact pads and the rail I.D. greatly increases the locking characteristic of the protrusion.

It can thus be seen that there has been provided which obviates the problem of increased oil consumption; which can be achieved at relatively low cost; which can be assembled readily without any possibility of misassembly; and which would be effective to eliminate any possibility of alignment of the gaps of the oil ring rails and the spacer expander.

I claim:

1. An oil ring assembly comprising
   a pair of split rails, each having a gap,
   a piston ring spacer expander on which said rails are mounted and having at least one radial recess,
   each rail being generally rectangular in cross-section and having a greater radial thickness than axial thickness,
   each said rail having a radially outer edge and a radially inner edge, each rail having a radially inwardly extending protrusion on its radially inner edge, and spaced radially from the outer edge, each said protrusion lying substantially entirely within the axial thickness of the rail, each said protrusion extending radially inwardly into and engaging said radial recess in the spacer expander to limit the circumferential movement of the rail relative to the spacer expander, said protrusions on said rails being positioned such that the gaps of said rails are staggered and such that the gap of one split rail is spaced circumferentially from the gap of the other rail.

2. The oil ring assembly set forth in claim 1 wherein each said protrusion comprises a punched protrusion formed by applying an axial force to an inner radial portion of the rail.

3. The oil ring assembly set forth in claim 2 wherein said protrusion is located adjacent the rail gap.

4. The oil ring assembly set forth in claim 3 wherein said protrusion has a minimum radial dimension of 0.001" and a maximum radial dimension of 0.009".

* * * * *